United States Patent [19]

Croset et al.

[11] 4,178,418

[45] Dec. 11, 1979

[54] GALVANIC CELL FOR THE ELECTROCHEMICAL PRODUCTION OR STORAGE OF ELECTRICAL ENERGY

[75] Inventors: Michel Croset; Gonzalo Velasco, both of Paris, France

[73] Assignee: Thomson - CSF, Paris, France

[21] Appl. No.: 902,760

[22] Filed: May 3, 1978

[30] Foreign Application Priority Data

May 4, 1977 [FR] France .............................. 77 13513

[51] Int. Cl.$^2$ ........................................... H01M 12/04
[52] U.S. Cl. ..................................... 429/27; 429/101; 429/33
[58] Field of Search ...................... 429/27, 30, 33, 101, 429/193

[56] References Cited

U.S. PATENT DOCUMENTS

| | | | |
|---|---|---|---|
| 3,475,223 | 10/1969 | Kummer et al. | 429/33 |
| 3,698,955 | 10/1972 | Lilly et al. | 429/33 |
| 4,032,694 | 6/1977 | Dubin et al. | 429/33 |

*Primary Examiner*—Donald L. Walton
*Attorney, Agent, or Firm*—Oblon, Fisher, Spivak, McClelland & Maier

[57] ABSTRACT

A means for producing electricity from an electrochemical reaction as well as for storing and recovering electrical energy, which utilize electrochemical reactions. The basic galvanic cell comprises a first solid non-porous body capable of storing large quantities of an ionizable species (this is the case with a metal hydride and hydrogen) the ionized species ($H^+$ ions) migrating through a thin-film solid electrolyte (alumina) towards a second body (oxygen or atmospheric air) where the electrochemical reaction takes place (and the water produced is easily eliminated). The internal resistance of the cell is low because the electrolyte is in thin-film form. The technology of thin-film deposition is possible because the first body is a non-porous solid.

4 Claims, 2 Drawing Figures

GALVANIC CELL FOR THE ELECTROCHEMICAL PRODUCTION OR STORAGE OF ELECTRICAL ENERGY

BACKGROUND OF THE INVENTION

The present invention relates to a solid-electrolyte galvanic cell and to electrochemical devices for the production and/or storage of electrical energy, which utilise this kind of cell. The invention has applications in the field of "combustion cells" or "fuel cells", as well as in the storage of electrical energy in electrochemical form in accumulators.

Those skilled in the art will be aware of the principle of solid-state galvanic cells in which a metal electrode (silver, lithium) produces an electro-active compound ($Ag^+$ ion for example) which is transported by a solid electrolyte (silver chloride, silver iodide) and reduces compounds existing in a second electrode. An electromotive force then appears between the electrodes, which is proportional to the reduction of the free energy in the system.

SUMMARY OF THE INVENTION

The present invention aims at obtaining a solid electrolyte cell which makes it possible to form a device capable of producing or storing large quantities of electrical energy.

According to the invention there is provided a galvanic cell of the kind in which an electrochemical reaction employing at least one ionisable species, is used to produce electrical energy from chemical energy or to transform chemical energy into electrical energy, comprising:
(a) a first solid non-porous body capable of storing an ionisable species having a high coefficient of diffusion within said body;
(b) a first electrode constituted by a grid of a material able to be a catalyst of the ionisation of said ionisable species;
(c) a polycrystalline ceramic fitted to be deposited on the first body according to the technology of thin-film deposition, constituting a layer so thin as to exhibit a low ohmic resistance to the current of the ion produced by said ionisable species and a relatively high ohmic resistance to the electronic current;
(d) a second electrode constituted by a grid;
(e) a second body capable of receiving or furnishing said ionisable compound, producing electrical energy in the process, or to generate said ionisable compound by absorbing electrical energy.

BRIEF DESCRIPTION OF THE DRAWINGS

The invention will be better understood and other of its features rendered apparent from a consideration of the ensuing description and the accompanying drawings in which.

DESCRIPTION OF THE PREFERRED EMBODIMENTS

Figure 1:
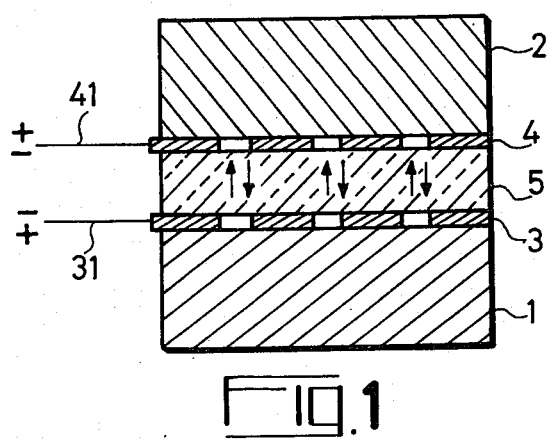
FIG. 1 illustrates the principle of the invention.

In accordance with the principle of the invention, a first body, occupying a volume, for example of cylindrical shape, and a second body 2 of the same shape, are plated at their flat, mutually opposite faces, with grids 3 and 4 constituting electrodes possessing electrical connections 31 and 41. Between these electrodes, there is located a solid electrolyte layer 5.

The body 1 is capable of storing large quantities of an ionisable species, for example hydrogen, due to the high coefficient of diffusion of the latter in the body 1, said body being for example a metal or a metal hydride. The body 1 should not be porous to make it possible to use the thin-film deposition of the polycrystalline ceramic.

The electrode 3 is capable, by catalysis, of promoting the formation of the desired ion from the ionisable species. This electrode, in the case of hydrogen, is for example made of nickel or platinum.

The electrode 4 is capable of promoting the reduction of the chemical compounds existing in the body 2, by catalysis.

One method of manufacture of the cell comprises for example the following steps:
on the body 1, the layers 3, 5 and 4 are deposited utilising the conventional technology of thin-film deposition supplemented, as far as the grid-shaped electrodes are concerned, by a process of photolithography;
the body 2 is then added, using containing means, if the body is in the liquid or gaseous state.

Two modes of operation are possible in the general case covered by the invention:
(1) the production of electrical energy, the ions formed at the electrode 3 migrating towards the electrode 4 and then chemically attacking the body 2 which gives rise to the development of the electromotive force between the connections 31 and 41;
(2) the storage of electrical energy by the reverse process, a reverse electromotive force then being applied between the electrodes 3 and 4.

Figure 2:
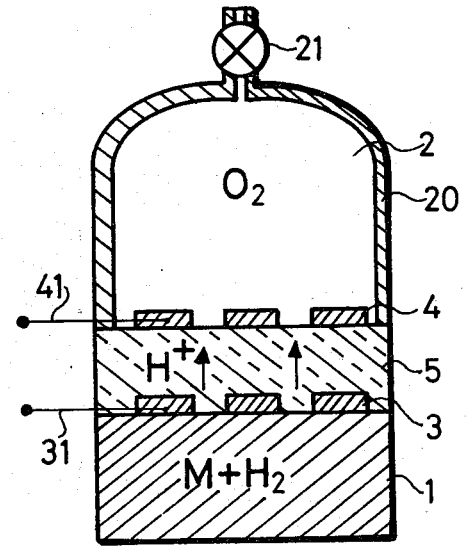
FIG. 2 schematically illustrates an embodiment of the invention (fuel cell) offered by way of example.

FIG. 2 illustrates a fuel cell in which the hydrogen produced by the body 1 (metal M charged with $H_2$) is transformed into $H^+$ ions by the nickel or platinum electrode 3.

The polycrystalline ceramic capable of carrying $H^+$ ions is for example alumina.

The top part of the cell is constituted by a reservoir 20 with a valve 21, into which oxygen is introduced. The cell can be operated in the open air. The water produced is easily eliminated.

The metal of the electrode 4 is a conventional catalyst in the combination of hydrogen and oxygen and in their dissociation.

The operation of this kind of cell is reversible: electrical energy can be stored in large quantity and recovered afterwards.

What is claimed as new and desired to be secured by Letters Patent of the United Stated is:

1. A galvanic cell of the kind in which an electrochemical reaction employing at least one ionisable species is used to produce electrical energy from chemical energy or to transform electrical energy into chemical energy, comprising:
(a) a first solid non-porous body belonging to the group of metals and metal hydrides capable of storing an ionisable species having a high coefficient of diffusion within said body;
(b) a first electrode constituted by a grid of catalytic material positioned on one side of the first non-porous body;
(c) a polycrystalline ceramic deposited on the first body through and over said grid according to the technology of thin-film deposition, constituting a layer so thin as to exhibit a low ohmic resistance to the current of the ion produced by said ionisable species and a relatively high ohmic resistance to the electronic current; and (d) a second electrode constituted by a grid of catalytic material disposed on top of the polycrystalline ceramic for promoting the reduction of ionizable species.

2. A galvanic cell as claimed in claim 1, wherein said first body is a metal hydride and said ionisable species is hydrogen.

3. A galvanic cell as claimed in claim 1, wherein said polycrystalline ceramic is alumina.

4. A galvanic cell as claimed in claim 2, wherein said cell is placed in oxygen or atmospheric air.

* * * * *